United States Patent
Kreiner et al.

(10) Patent No.: US 10,764,904 B2
(45) Date of Patent: Sep. 1, 2020

(54) CHANNEL ALLOCATION

(71) Applicant: AT&T INTELLECTUAL PROPERTY I, L.P., Atlanta, GA (US)

(72) Inventors: Barrett Kreiner, Woodstock, GA (US); Ryan Schaub, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 24 days.

(21) Appl. No.: 16/167,669

(22) Filed: Oct. 23, 2018

(65) Prior Publication Data
US 2020/0128555 A1 Apr. 23, 2020

(51) Int. Cl.
| H04L 12/28 | (2006.01) |
| H04W 72/08 | (2009.01) |
| H04J 1/16 | (2006.01) |
| H04W 88/02 | (2009.01) |
| H04W 88/08 | (2009.01) |

(52) U.S. Cl.
CPC .......... H04W 72/085 (2013.01); *H04W 88/02* (2013.01); *H04W 88/08* (2013.01)

(58) Field of Classification Search
CPC ...... H04L 5/0058; H04W 72/02; H04W 88/08
USPC ................. 370/252, 329, 386, 430
See application file for complete search history.

(56) References Cited

U.S. PATENT DOCUMENTS

| 6,982,969 | B1 | 1/2006 | Carneal et al. |
| 8,089,881 | B2 | 1/2012 | Walton et al. |
| 8,320,237 | B2 | 11/2012 | Frantz et al. |
| 8,565,263 | B2 | 10/2013 | Scarborough |
| 8,711,820 | B2 | 4/2014 | Grandhi |
| 8,831,625 | B2 | 9/2014 | Joslyn et al. |
| 8,855,136 | B2 | 10/2014 | Walton et al. |
| 8,868,094 | B2 | 10/2014 | De Pasquale et al. |
| 9,215,598 | B2 | 12/2015 | Vuyyuru et al. |
| 9,742,664 | B2 | 8/2017 | Carson et al. |
| 9,756,644 | B2 | 9/2017 | Xu et al. |
| 2009/0310692 | A1* | 12/2009 | Kafle .................. H04L 5/0007 375/260 |
| 2014/0044041 | A1* | 2/2014 | Moshfeghi .......... H04B 7/0871 370/328 |
| 2017/0201871 | A1* | 7/2017 | Ryu ..................... H04W 4/70 |
| 2019/0104435 | A1* | 4/2019 | Cho .................. H04W 72/0446 |

FOREIGN PATENT DOCUMENTS

KR 20180010843 A 1/2018

* cited by examiner

*Primary Examiner* — John Pezzlo
(74) *Attorney, Agent, or Firm* — Baker Botts, LLP

(57) ABSTRACT

In one embodiment, a method includes identifying, by a network access point, a plurality of channels within a spectrum block and determining, by the network access point, to allocate at least one channel of the plurality of channels to a device based on requirements of the device. The method further includes allocating, by the network access point, the at least one channel to the device. The at least one channel is exclusively for use between the network access point and the device.

17 Claims, 6 Drawing Sheets

CHANNEL ALLOCATION

TECHNICAL FIELD

This disclosure generally relates to channel allocation, and more specifically to systems and methods for allocating channels in a network.

BACKGROUND

Both wired and wireless networks suffer from signal-to-noise ratio (SNR) issues. To overcome these issues, network vendors may increase the signal strength to reduce interference (i.e., noise) experienced by a particular device. However, increasing the signal strength creates more environmental interference for other devices.

SUMMARY

According to an embodiment, a method includes identifying, by a network access point, a plurality of channels within a spectrum block and determining, by the network access point, to allocate at least one channel of the plurality of channels to a device based on requirements of the device. The method further includes allocating, by the network access point, the at least one channel to the device. The at least one channel is exclusively for use between the network access point and the device.

According to another embodiment, a system includes one or more processors and a memory storing instructions that, when executed by the one or more processors, cause the one or more processors to perform operations including identifying, by a network access point, a plurality of channels within a spectrum block and determining, by the network access point, to allocate at least one channel of the plurality of channels to a device based on requirements of the device. The operations further include allocating, by the network access point, the at least one channel to the device. The at least one channel is exclusively for use between the network access point and the device.

According to yet another embodiment, one or more computer-readable storage media embody instructions that, when executed by a processor, cause the processor to perform operations including identifying, by, a network access point, a plurality of channels within a spectrum block and determining, by the network access point, to allocate at least one channel of the plurality of channels to a device based on requirements of the device. The operations further include allocating, by the network access point, the at least one channel to the device. The at least one channel is exclusively for use between the network access point and the device.

Technical advantages of this disclosure may include one or more of the following. The network access point accommodates devices that may not be designed to utilize all frequency bands by optimizing connectivity over performance for these devices. When the device connectivity demand exceeds channels available to a particular device, the access point may request the device to transition to a new channel in the same spectrum block, to transition to a new channel in a different supported spectrum block, or to disconnect for a period of time. Disconnecting a device from a channel permits another device that can only use that channel to connect.

As another example, an access point may permit two devices to utilize a direct communication path instead of routing through the access point infrastructure, which may lower latency of communication between the devices and enables true edge-to-edge communication between the devices. With each device communicating with the access point on a private channel, no peer device noise is introduced, which reduces or eliminates the tendency to increase signal strength in an effort to lower interference.

Additionally, the systems and methods of this disclosure can cohabitate and tolerate older solutions and environmental noise (e.g., existing wireless-fidelity (WI-FI), Bluetooth, LTE-U, cordless phones, microwave ovens, etc.) by excluding spectrum blocks where there is noise and instead utilizing smaller channels that may create tolerable interference. Device requirements may be matched with available channels to optimize the overall network performance and avoid interfering with higher QoS devices, and multiple frequency blocks may be used without changing out hardware and/or software.

As yet another example, the systems and methods of this disclosure may be applied to very-high-bit-rate digital subscriber line (VDSL). The available capacity may be increased by continuously re-testing channels. Restarts may be faster by persisting a modified channel map during power events. Immediate lower capacity connectivity will be provided, and then each channel may be dynamically isolated, retested, and potentially reclassified while the connection is in use. Unneeded carriers on a given line are avoided, which reduces environmental noise and results in less power for transmission or reception with higher SNR, Transient interference is handled without retraining the entire line. By allowing channels to change direction, a given circuit can move from fixed asymmetric capacity to dynamically allocated capacity based on end use.

As a further example, the systems and methods of this disclosure may be applied to 5G networks. Spectrum allocation may be matched to device capabilities, reducing under utilization and allowing more devices to be connected to a given site within the same spectrum footprint. Fractional handoff supports continuous connectivity when passing through multiple access points and allows microcells to augment the macro network without handoff issues. Access point bonding allows for a single device to be served by multiple sites/sectors when backhaul is saturated.

The systems and methods of this disclosure may also be applied to Ethernet. Ethernet may suffer from signal degradation across spectrum, especially in datacenter environments where there are high electromagnetic fields from other network and compute devices. Dividing Ethernet into frequency channels may allow for higher bandwidth for low attenuated connections and may reduce environmental noise by not utilizing spectrum when capacity is not needed.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Wireless device vendors have attempted to increase the available bandwidth between access points and devices of a network by using wider spectrum and/or bonding fixed channels. While wider channels result in increased bandwidth availability, wider channels also cause the connection to be exponentially more susceptible to interference from other devices that utilize some portion of the same spectrum, which results in a reduced transmission rate.

The wired network technology 'VDSL', has attempted to increase the available bandwidth using many smaller channels (i.e., 256 carriers). The smaller channels are across approximately one MHz of spectrum, which allows VDSL to avoid using spectrum with higher SNR. However, due to the number of channels used, VDSL suffers from long hoot cycles from training, where each individual channel is quality tested prior to the channel being utilized. Since all channels are quality tested before the end user network connectivity is available, network unavailability is noticeable. Some channels that could otherwise be considered usable at slower rates are excluded due to higher SNR or attenuation, which reduces the overall available bandwidth to the end user. For example, transient interference may impact a channel, and the channel may be marked unusable after training. Advanced VDSL standards include the concept of vectoring which cancels signals to reduce SNR, but this is limited in real world deployment.

Traditional wireless and wired solutions may provide local bandwidth that exceeds the available backhaul, but this introduces unnecessary noise onto the local network. Because the number of unique devices on a given network is growing exponentially, each device is contending with the others for connectivity and bandwidth on the same frequencies, which creates further noise. Different devices have different bandwidth requirements, latency, and SNR tolerance, but all are treated equivalently or a the network.

Embodiments of this disclosure change the optimization of networks for more devices and higher speeds rather than changing, optimization solely for higher speeds. Instead of using fewer, wider channels, the spectrum is divided into thousands of fixed, smaller channels that are less susceptible to interference and do not generate as much environmental interference during transmission, individual channels may be aggregated together for increased device bandwidth on demand.

Figure 1:
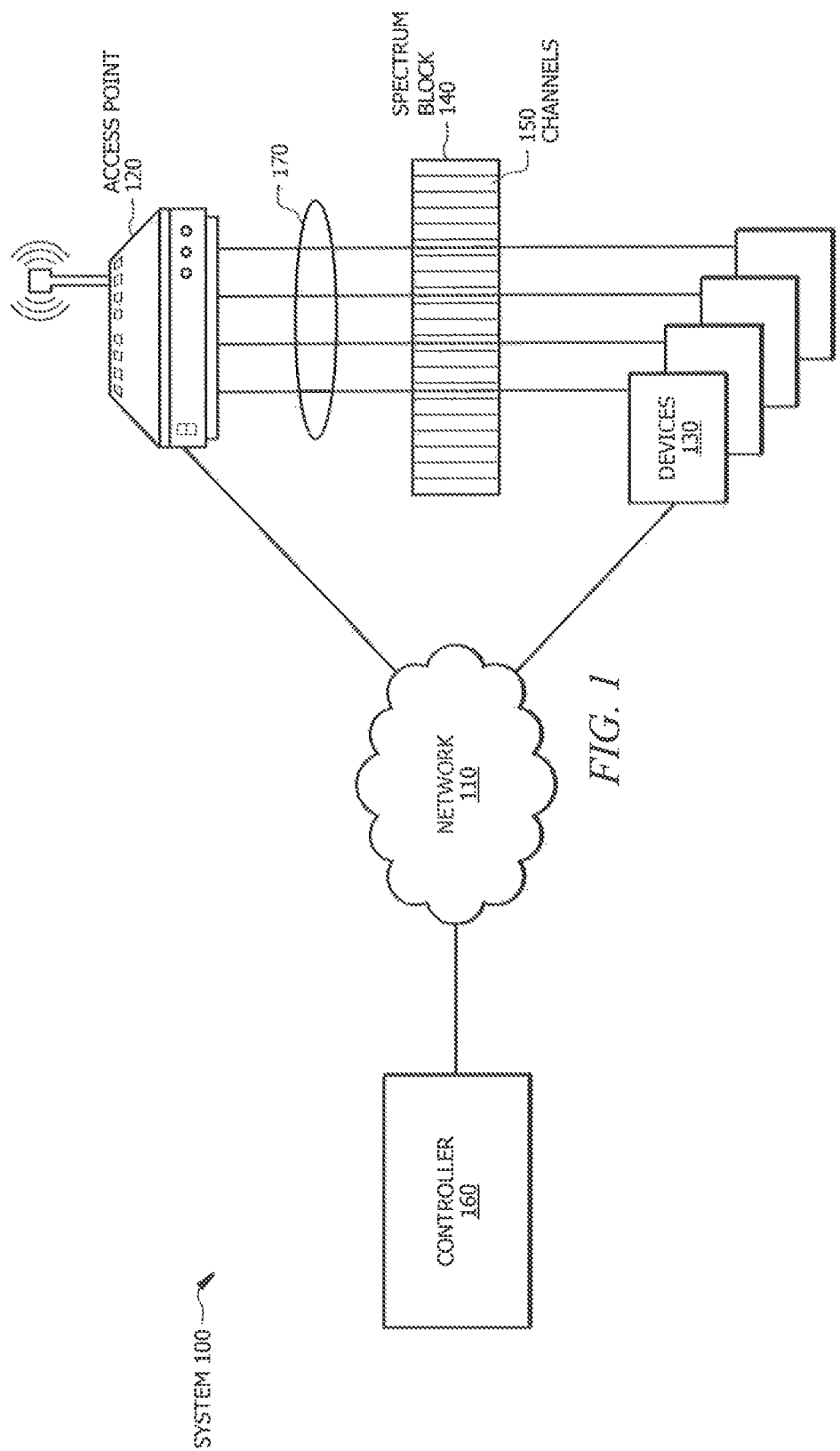
FIG. 1 illustrates an example system for channel allocation.
Figure 2:
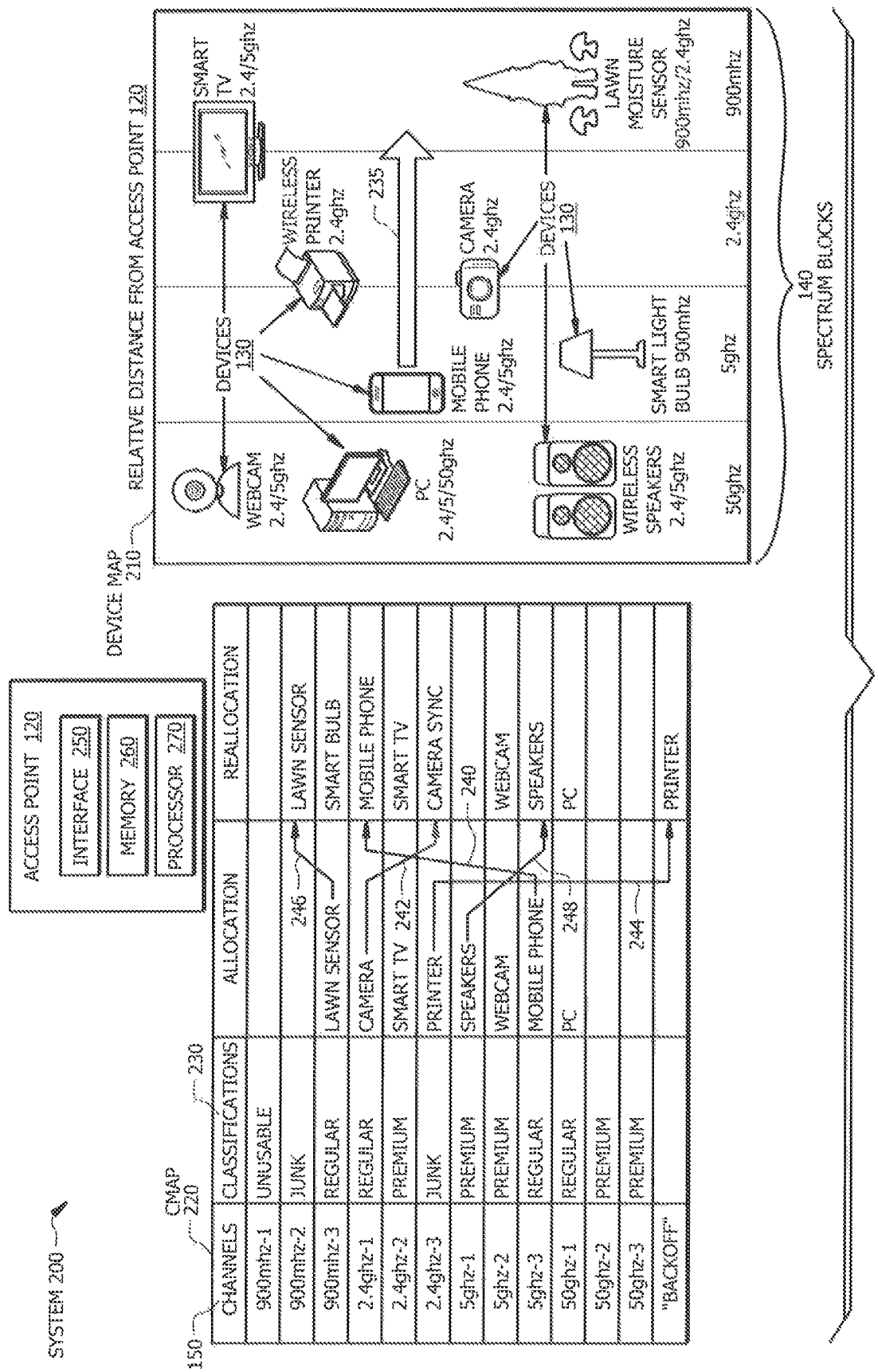
FIG. 2 illustrates an example system for channel allocation that may be used by the system of FIG. 1.
Figure 3:
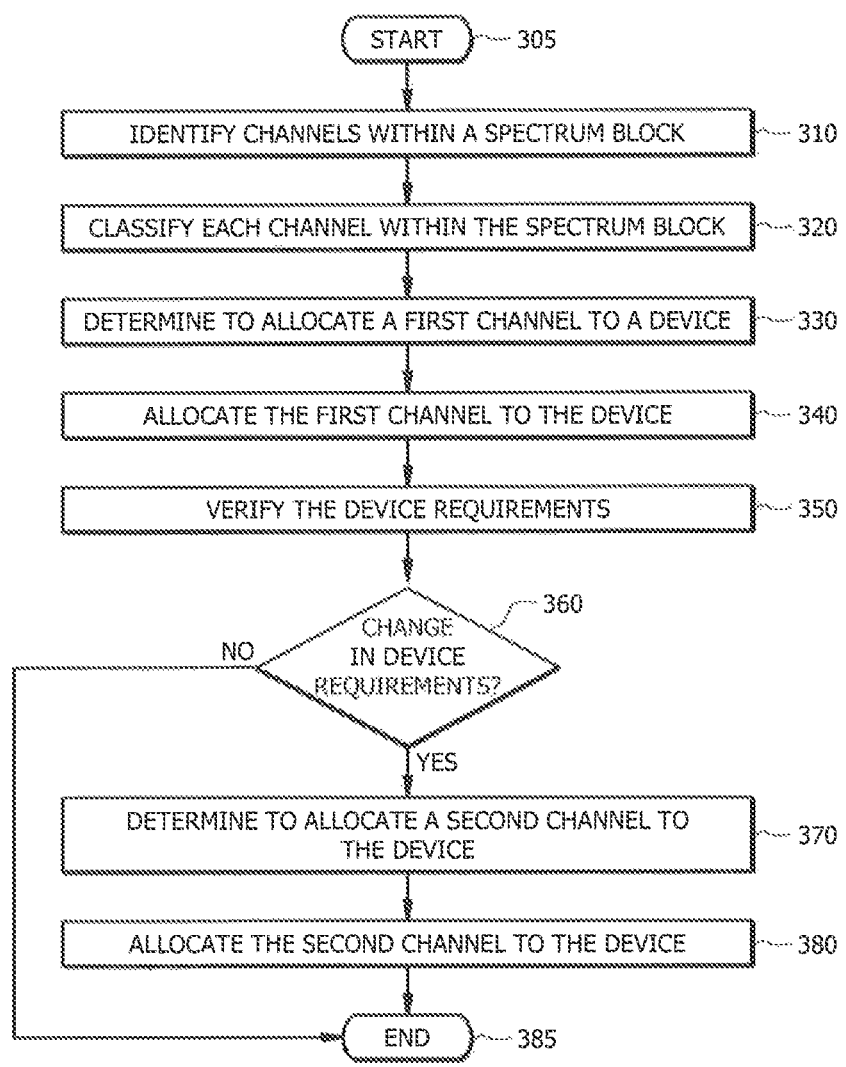
FIG. 3 illustrates an example method for channel allocation.
Figure 4:
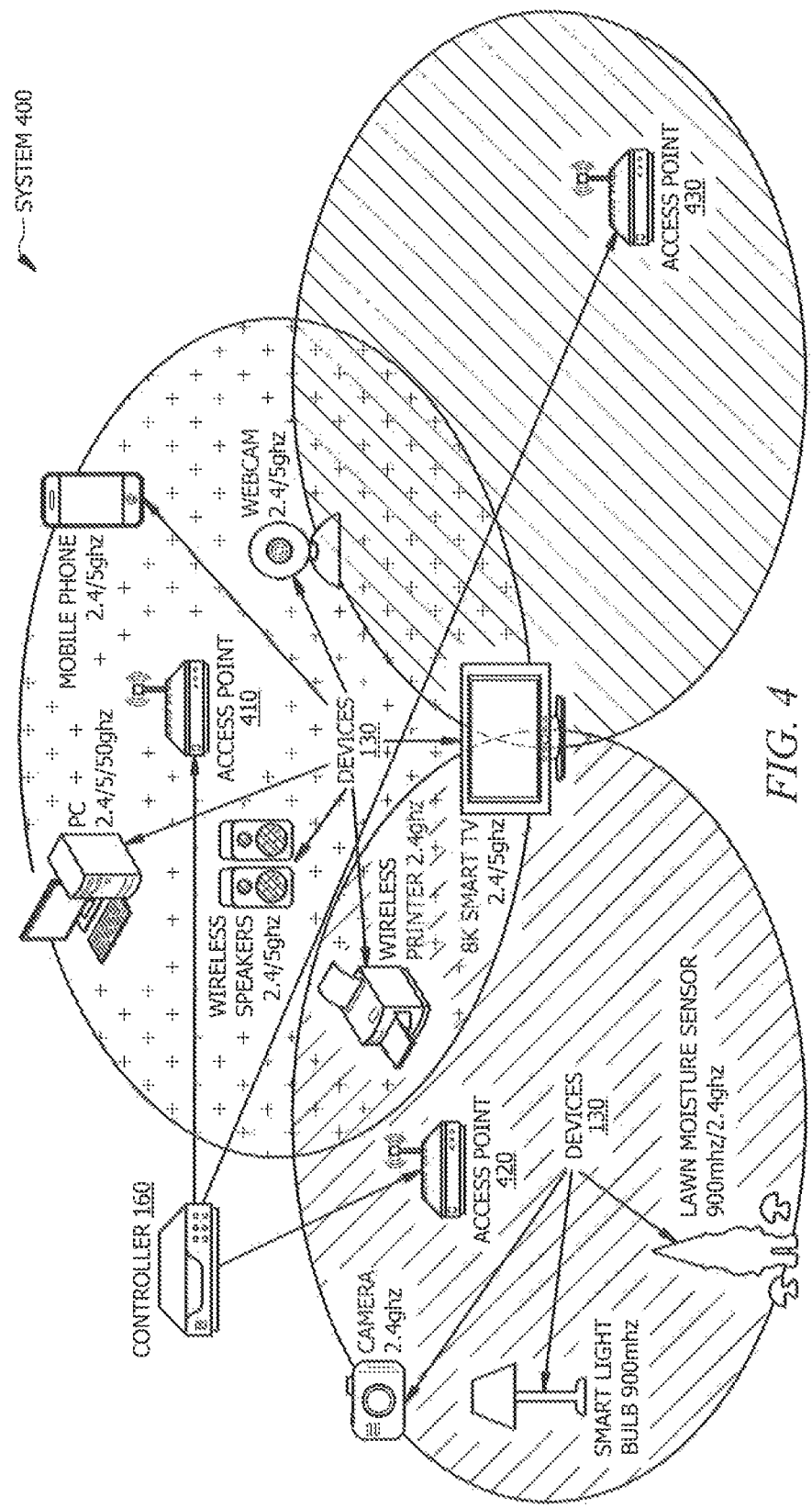
FIG. 4 illustrates an example system for channel allocation among multiple access points.
Figure 5:
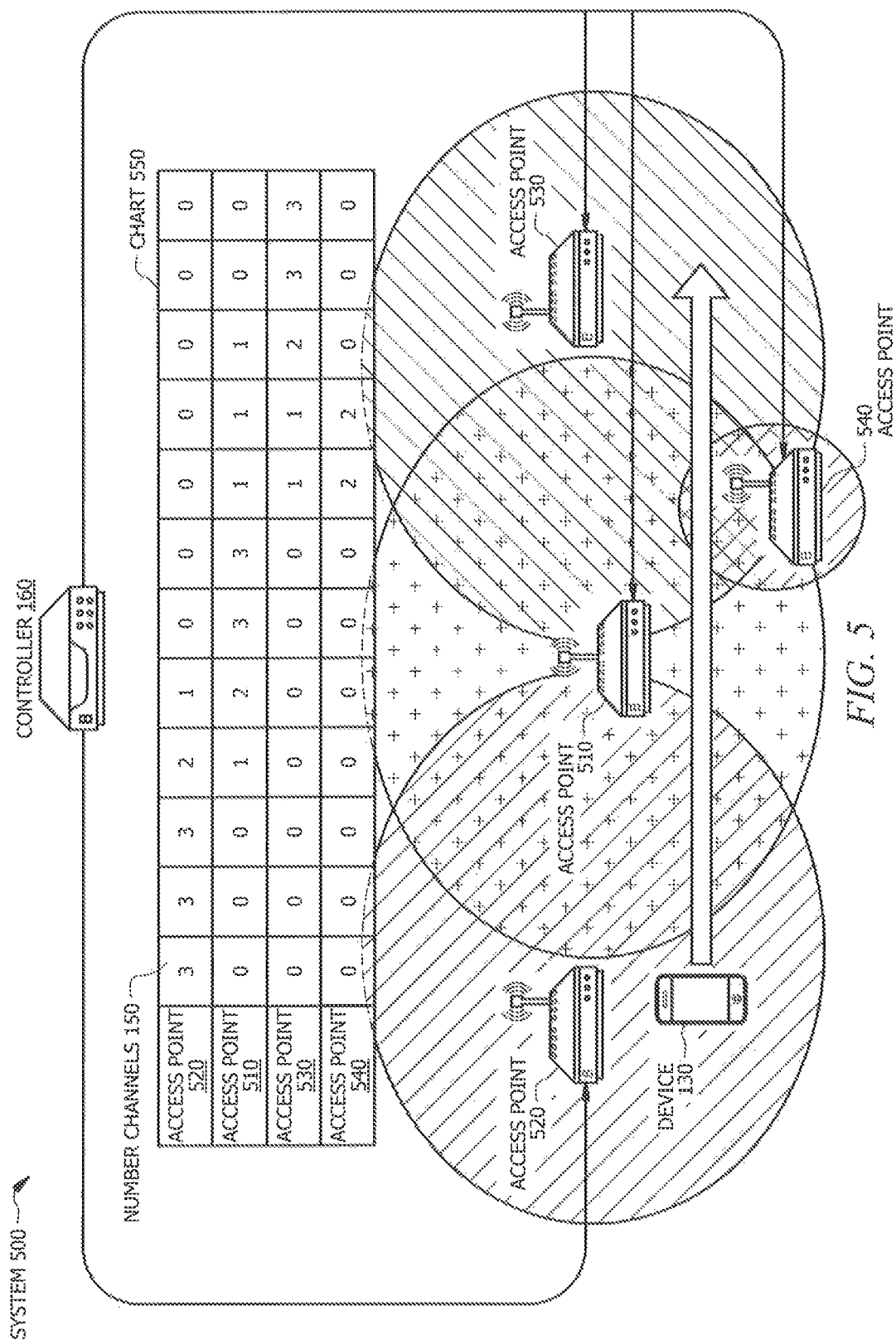
FIG. 5 illustrates an example system for channel allocation of a device in motion.
Figure 6:
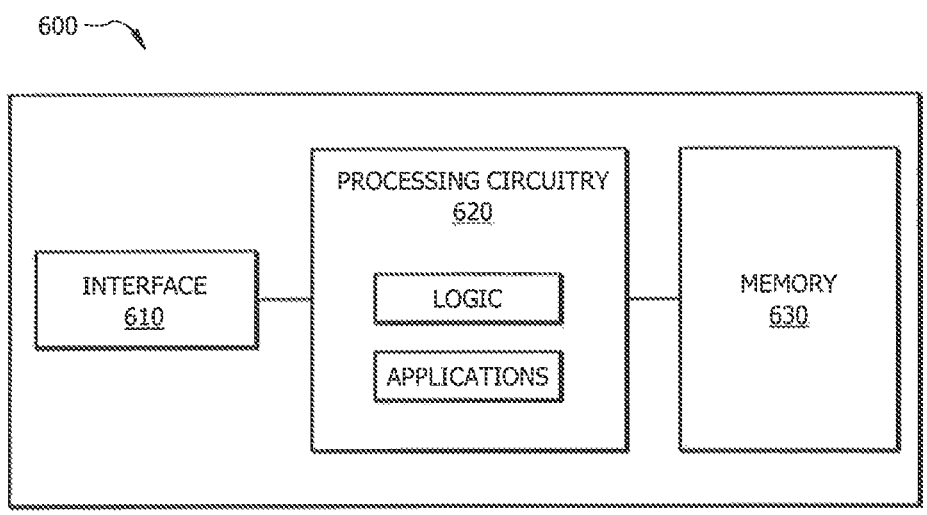
FIG. 6 illustrates an example computer system that may be used by the systems and methods described herein.

FIGS. 1 through 6 show example systems and methods for allocating channels of a network. FIG. 1 shows an example system for channel allocation, and FIG. 2 shows an example system for channel allocation that may be used by the system of FIG. 1. FIG. 3 shows an example method for channel allocation, FIG. 4 shows an example system for channel allocation among multiple access points, and FIG. 5 shows an example system for channel allocation of a device in motion. FIG. 6 shows an example computer system that may be used by the systems and methods described herein.

FIG. 1 illustrates an example system 100 for channel allocation. System 100 of FIG. 1 includes a network 110, an access point 120, devices 130, a spectrum block 140, channels 150, and a controller 160. System 100 or portions thereof may be associated with an entity, which may include any entity, such as a business or company (e.g., a network vendor) that allocates channels of a network. The elements of system 100 may be implemented using any suitable combination of hardware, firmware, and software.

Network 110 may be any type of network that facilitates communication between components of system 100. Network 110 may connect access point 120, devices 130, and controller 160 of system 100. Although this disclosure shows network 110 as being a particular kind of network, this disclosure contemplates any suitable network. One or more portions of network 110 may include an ad-hoc network, an intranet, are extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a combination of two or more of these, or other suitable types of networks. Network 110 may include one or more networks. Network 110 may be any communications network, such as a private network, a public network, a connection through Internet, a mobile network, a WI-FI network, a Bluetooth network, etc. One or more components of system 100 may communicate over network 110. For example, access point 120 may communicate over network 110, including receiving information from devices 130 and transmitting information to devices 130. As another example, controller 160 may communicate over network 110, including receiving information from access point 120 and devices 130 and transmitting information to access point 120 and devices 130.

Access point 120 represents a device of network 110 that permits devices 130 to connect to network 110. Access point 120 may include a router (e.g., a wireless router) or may be connected to a router to provide access to network 110. Access point 110 may be connected (e.g., hardwired) to other devices (e.g., network switches or broadband modems). Access point 120 may be a slave controller to controller 160 of system 100. Access point 120 may be implemented using any suitable combination of hardware, firmware, and software. For example, access point 120 may be implemented using one or more components of the computer system of FIG. 6.

Access point 120 may act as a frequency manager. As frequency manager, access point 120 may run quality control (QC) tests on channels 150 at predetermined intervals. As frequency manager, access point 120 may manage a channel map (CMAP). For example, access point 120 may determine the availability of one or more channels 150, whether one or more channels 150 are in use, the quality of one or more channels 150, and whether to provision one or more channels 150 and publish this information in the CMAP along one or more reserved common low frequency channels. Access point 120 may classify channels 150 into classifications based on a frequency range of each channel 150, an estimated capacity based on SNR for each channel 150, and the requirements of devices 130. Channel classifications may include "unusable," "junk," "regular," and "premium" channel classifications. Channel classification is described in more detail in FIG. 2 below.

Access point 120 may act as a director of channels 150. As director, access point 120 may handle access requests from one or more devices 130. Access point 120 may allocate access to devices 130 and revoke access from devices 130. Access point 120 may instruct a particular device 130 to stop using a particular channel 150 and wait a predetermined amount of time before requesting a new channel 150.

Access point 120 may manage channels 150 used between two devices 130 (e.g., local network devices) that directly communicate rather than communicating through access point 120. For example, access point 120 may mark one or more channels 150 in use in a CMAP and monitor the quality of service (QoS) of one or more channels 150 without inserting itself in the communication. Eliminating communications through access point 120 may reduce the number of channels 150 required for traffic and reduce network latency between devices 130. This direct communication between devices 130 may encompass Bluetooth and other near field use cases.

Access point 120 may manage devices 130 to prevent devices from using unauthorized channels 150. Access point 120 may manage transient environmental interference on a given channel 150. In addition to a broadcast-only channel map frequency, each individual device 130 may be allocated at least one exclusive channel (e.g., half-duplex channel) to access point 120. For many devices 130 (e.g., Internet of Things (IoT) devices), this single channel 150 may be sufficient for their communication needs.

Access point 120 may aggregate two or more channels 150 together and allocate the aggregated two or more channels 150 to a particular device 130. For example, access point 120 may allocate a first channel 150 (e.g., a 256 kHz channel) to a first device 130, a second channel 150 (e.g., a 256 kHz channel) to a second device 130, and third and fourth channels 150 (e.g., two 256 kHz channels) to a third device 130. Access point 120 may aggregate channels 150 together in response to determining that a particular device 130 requires more capacity than can be provided by a single channel 150.

Access point 120 may allocate channels 150 with a high SNR as lower bandwidth, lower quality channels 150 that would otherwise be marked unusable. Nonetheless, channels 150 with a high SNR may be left unused if not needed. Device bandwidth requirements, signal strength requirements, the capacity of access point 120, and the backhaul capacity of access point 120 may all be factored into channel allocation and/or reallocation.

Backhaul capacity is the capacity of access point 120 to transmit data from devices 130 to nodes of network 110. Backhaul capacity may be determined based on preconfigured backhaul limits, prior and/or continuous testing of network links with historical reported values, network flow monitoring to identify maximum capacities, a query of the gateway (e.g., bonded downstream and bonded upstream rates), network geography/topology (e.g., a predetermined speed constraint for a network node of an area served by VDSL or fiber), or any combination of the preceding. Access point 120 may request that device 130 utilize another channel 150 on demand when frequencies are otherwise needed and/or if the quality of channel 150 degrades. Access point 120 may not allocate channels 150 in excess of the available backhaul capacity of access point 120 to avoid creating additional environmental noise. Access point 120 may discontinue use of channels 150 not required to reduce power and noise in the environment of network 110.

Content transmission may be split between the two access points 120 based on available resources and backhaul. Generally, the available backhaul of a given access point 120 is less than the available local network bandwidth, so splitting transmissions between multiple access points 120 may improve performance. A first access point 120 may exhaust its available backhaul and utilize a second access point 120 with capacity to maintain a connection to device 130. Interference localized near first access point 120 that would prevent first access point 120 from utilizing one or more channels 150 may not impact device 130 or second access point 120.

Each device 130 of system 100 represents any suitable computing component that may be used to access network 110 to communicate information. Devices 130 may include one or more mobile devices, such as a smartphone, a laptop computer, a tablet computer, a camera. (e.g., a video camera), wearables, and toys. Devices 130 may include one or more non-mobile devices, such as a television, a desktop computer, a webcam, a printer, speakers, a smart appliance, and a smart meter. Devices 130 may include one or more sensing devices, such as a motion detector, a smart thermostat, a door lock sensor, a smart light bulb, and a lawn moisture sensor. Devices 130 may be hardwired or have wireless network connection capabilities (e.g., WI-FI and/or Bluetooth capabilities). Devices 130 may be used to monitor traffic, environmental conditions, security, and the like. Devices 130 may be implemented using any suitable combination of hardware, firmware, and software. For example, devices 130 may be implemented using one or more components of the computer system of FIG. 6.

Each device 130 has one or more requirements for accessing network 110. The requirements of each device 130 may include minimum bandwidth requirements, maximum bandwidth requirements, directional requirements, latency requirements, QoS requirements, frequency band capabilities, and the like. Devices 130 include their requirements as part of their registrations with network 110. Device registration and channel requests may be received by access point 120 and/or controller 160 across a low common frequency that is not otherwise used for data transmission. Each device 130 may request one or more specific channels 150 from a broadcasted CMAP, which may or may not be allocated based on the utilization of access point 120.

Device 130 may be connected to more than one access point 120 concurrently. For example, device 130 may transition from a first access point 120 to a second access point 120. As another example, device 130 may maintain connections to multiple access points 120 concurrently. If device 130 is in motion, individual channels 150 may be migrated from one access point 120 to another access point 120. A first access point 120 may mark the frequencies used to communicate between device 130 and a second access point 120 as a direct connection between two devices 130.

Spectrum block 140 of system 100 is a contiguous section of radio spectrum frequencies. Spectrum block 140 may be an unlicensed spectrum block. For example, spectrum block 140 may be a 900 MHz range spectrum block, a 2.4 GHz range spectrum block, a 50 GHz range spectrum block, or a 50 GHz range spectrum block. Spectrum block 140 may be divided into channels 150. A system administrator of system 100 may divide spectrum block 140 into a specific number of channels 150 and communicate the specific number of channels 150 to controller 160.

System 100 may determine the number of channels 150 via an iterative process based on one or more factors. The number of channels 150 may be limited by a geopolitically bound legal spectrum that includes licensed and/or unlicensed spectrum. The determined backhaul capacity may identify the quantity of spectrum required. System 100 may subdivide the backhaul capacity into predefined channels 150. A scan of the spectrum may be performed to determine potential interference on any given channel 150. Channels 150 with less interference are preferred over channels 150 with more interference. If the capacity of the clear channels 150 exceeds the backhaul capacity, then the clear channels 150 may be utilized without further iteration. If the capacity of the clear channels 150 does not exceed the backhaul capacity, then system 100 may iterate through the noisier channels 150 and subdivide the noisier channels 150 into predefined channels 150 to identify clear spectrum within the subdivided channels 150. Noisy channels 150 may be recorded even if not needed when communication with device 130 is required but no clear channel 150 is available.

Controller 160 distributes spectrum block 140, divided into the specific number of channels 150, to access point 120. A 900 MHz range spectrum block 140 may be divided into over 400 64 kilohertz (kHz) channels 150. A 2.4 GHz range spectrum block 140 may be divided into over 1,000 64 kHz channels 150. A 5 GHz range spectrum block 140 may be divided into over 2,000 256 kHz channels 150. A 50 GHz range spectrum block 140 may be divided into over 100,000 10 MHz channels 150. As another example, spectrum block 140 may be a licensed spectrum block that avoids restricted spectrum or a country-specific spectrum block. Multiple spectrum blocks 140 may be used by system 100 concurrently.

System 100 divides spectrum block 140 into a smaller number of channels 150 than those used in traditional systems. For example, the division of the 2.4 GHz spectrum block 140 into over 1,000 64 kHz channels 150 provides more channels 150 than WI-FI's traditional 16 current, 3 non-overlapping channels. As another example, the division of the 5 GHz spectrum block 140 into over 2,000 256 kHz channels 150 provides more channels 150 than WI-FI's traditional 24 non-overlapping channels.

Each channel 150 of spectrum block 140 represents a medium that carries a signal. Each channel 150 is a predetermined width (e.g., 64 kHz, 256 kHz, or 10 MHz). The width of each channel 150 controls the amount of bandwidth used within spectrum block 140 during transmission. Channels 150 of spectrum block 140 are directional (i.e., send only, receive only, half-duplex, full-duplex, or polled). Full-duplex channels support transmission and receive by signal processing, which results in less bandwidth for each end user, but fully concurrent transmission.

Full-duplex connections are possible when there are only two devices 130 on the same frequency. This requires active monitoring of both the received signal from a remote device 130 ($\beta$) and the known transmission of a local device 130 ($\alpha$). The signal to a third party will be $\gamma(=\alpha+\beta)$. Local device 130 may process the remote device 130s' signal by $\gamma-\alpha$, and the remote device 130 by $\gamma-\beta$. This allows channel compression, where the available bandwidth of $\gamma>\alpha$ or $\beta$, but not $\gamma>\alpha$ and $\beta$. This potentially provides higher security, similar to public key infrastructure (PKI), since a third-party observer will not know what the original $\alpha$ or $\beta$ signals are to subtract from $\gamma$.

Controller 160 of system 100 is an application that manages the distribution of spectrum blocks 140 and channels 150 to one or more access points 120 of network 110. Controller 160 assigns spectrum block 140 and channels 150 to access point 120 of network 110. Controller 160 may assign one or more other spectrum blocks 140 and channels 150 to other access points 120 of network 110. Controller 160 may be a master controller and each access point 120 may be a slave controller. Controller 160 may be implemented using any suitable combination of hardware, firmware, and software. For example, controller 160 may be implemented using one or more components of the computer system of FIG. 6.

Although FIG. 1 illustrates a particular arrangement of network 110, access point 120, devices 130, spectrum block 140, channels 150, and controller 160, this disclosure contemplates any suitable arrangement of network 110, access point 120, devices 130, spectrum block 140, channels 150, and controller 160. Access point 120, devices 130, and/or controller 160 may be connected to each other directly, bypassing network 110. Access point 120, devices 130, and/or controller 160 may be physically or logically co-located with each other in whole or in part. Although FIG. 1 illustrates a particular number of networks 110, access points 120, devices 130, spectrum blocks 140, channels 150, and controllers 160, this disclosure contemplates any suitable number of networks 110, access points 120, devices 130, spectrum blocks 140, channels 150, and controllers 160. For example, network 110 may include multiple access points 120 and multiple spectrum blocks 140.

In operation, controller 160 of system 100 distributes spectrum block 140, which is divided into a predetermined number of channels 150 specified by a system administrator, to access point 120. Access point 120 identifies channels 150 (e.g., 2,000 256 kHz channels) within spectrum block 140 (e.g., 5 GHz spectrum block) and classifies each channel 150 into a classification (e.g., "unusable," "junk," "regular," or "premium" channel classification) based on an effective range of each channel 150, an estimated capacity due to SNR for each channel 150, and device requirements (e.g., bandwidth, latency, and SNR tolerance). Access point 120 receives, from each device 130, a request to access network 110 and the requirements of each device 130 (e.g., minimum and maximum bandwidth requirements, latency requirements, and SNR tolerances). Access point 120 allocates (see notation 170) channels 150 of spectrum block 140 to devices 130 based on the classification of allocated channels 150 and the requirements of devices 130. Each channel 150, allocated by access point 120, is exclusively for use between access point 120 and a particular device 130.

As such, system 100 of FIG. 1 allocates smaller channels 150 to devices 130 as compared to traditional systems (e.g., WI-FI's 24 channels for a 5 GHz spectrum block) and provides each device 130 with at least one private channel 150, which reduces traffic interference to and from device 130 during transmission, FIG. 2 illustrates an example system 200 that may be used by system 100 of FIG. 1. FIG. 2 includes access point 120, a device map 210, and a CMAP 220. Device map 210 illustrates a map of devices 130 of FIG. 1 allocated by, access point 120 to different spectrum blocks 140. CMAP 220 illustrates the allocation by access point 120 of channels 150 to devices 130. Devices 130 include a 2.4/5 GHz webcam, a 2.4/5/50 GHz personal computer (PC), a 2.4/5 GHz smart TV, a 2.4 GHz wireless printer, a 2.4/5 GHz mobile phone, a 2.4 GHz camera, 2.4/5 GHz wireless speakers, a 900 MHz smart light bulb, and a 900 MHz/2.4 GHz lawn moisture sensor. Access point 120 receives the device requirements for devices 130. The device requirements indicate the one or more spectrum blocks 140 in which each device 130 is operational. For example, the webcam is operable in the 2.4 and 5 GHz spectrum blocks 140.

CMAP 220 is a channel map of channels 150 for spectrum blocks 140. CMAP 220 may be in any suitable form, such as a list or a chart, CMAP 220 includes columns for channels 150, classifications 230, allocations, and reallocations.

Channels 150 include channels 1, 2, and 3 for a 900 MHz spectrum block 140, channels 1, 2, and 3 for a 2.4 GHz spectrum block 140, channels 1, 2, and 3 for a 5 GHz spectrum block 140, and channels 1, 2, and 3 for a 50 GHz spectrum block 140. Channels 150 also include a "backoff" channel that instructs a particular device 130 to disconnect from access point 120 for a predetermined period of time and attempt to acquire a new channel 150 after the predetermined period of time expires. Certain devices 130, due to their purposes, may intentionally support intermittent connectivity and spend the majority of their operational time disconnected.

Channels 150 may be classified into classifications 230 based on one or more properties. Each channel 150 may be classified based an effective range of channel 150, an estimated capacity due to SNR for channel 150, and/or and the requirements of one or more devices 130. Channel classifications 230 may include "unusable," "junk," "regular," and "premium" channel classifications 230. Channel classifications 230 may depend on the type of device 130 connected to channel 150.

Channel 150 may be classified as an "unusable" channel 150 when the noise on channel 150 exceeds a signal generation capacity of access point 120 to overcome the noise and create a stable, viable signal between devices 130. An "unusable" channel classification 230 indicates that the SNR of channel 150 is too low to be utilized by any device 130.

Channel 150 may be classified as a "junk" channel 150 when the noise on channel 150 can be overcome by a signal generation capacity of access point 120 to create a stable, viable signal between devices 130, but the signal would have low capacity. Utilizing a "junk" channel 150 may contribute to interference by other devices 130 using channel 150. A "junk" channel classification 230 may have low bandwidth and higher power requirements. The lawn sensor device, which only sends temperature and soil moisture values at predetermined intervals (e.g., once every fifteen minutes), may be allocated a "junk" channel 150 in the 900 MHz band for range.

Channel 150 may be classified as a "regular" channel 150 if channel 150 experiences interference that is overcome without impacting other devices 130 using the same spectrum. Channel 150 having a "regular" channel classification 230 utilizes optimal bandwidth. The mobile device may be allocated a "regular" channel 150 when idle.

Channel 150 may be classified as a "premium" channel 150 if the interference experienced by channel 150 is so minor that channel 150 can be utilized at its maximum potential capacity with minimal or no disruption. A "premium" channel classification 230 is preferred for high QoS devices (e.g., video, audio, gaming devices) and high bandwidth devices (e.g., storage devices). A video set-top-box (STB) from a wireless router may be allocated several "premium" channels 150 in the 50 GHz range.

Channel classifications 230 may be verified at regular time intervals. Channel classifications 230 may be verified during usage of one or more channels 150 and/or when a change in quality of one or more channels 150 is identified. The requirements of devices 130 may be matched with available channels 150 to optimize the overall performance of network 110 and/or to avoid or reduce the contention and/or interference between devices 130 with different QoS requirements. Devices 130 may have dynamic and/or transient requirements, driving rapid channel reallocation. For example, a video camera may be allocated a "junk" channel for notifications and then be reallocated a "premium" channel to transmit video in real-time.

Channels 150 of different classifications 230 may be allocated and used in combinations to improve performance. For example, a high capacity one-way channel 150 may send Internet Protocol (IP) packets without any packet acknowledgement, and one or more subscribers may concurrently acquire data from this channel 150. As another example, each device 130 may use a half-duplex, lower capacity channel to acknowledge packets, and if needed, make retransmission requests. Retransmissions may be slip-streamed into the one-way Channel 150 or provided along a second channel 150 to avoid missing QoS of the primary channel 150.

An introduction of a new device 130 and/or a movement of a particular device 130 may result in reallocation of one or more devices 130. As shown in CMAP 220, access point 120 allocates the mobile phone device to channel 3 of the 50 GHz spectrum block 140, which is classified as a "regular" channel. When the mobile phone moves out of the 50 GHz range and to the edge the 2.4 GHz range, as shown in device map 210 (see notation 235), the mobile phone requires a lower channel at the best available quality to maintain the connection. Access point 120 reallocates (see notation 240 of CMAP 220) the mobile phone to channel 1 of the 2.4 GHz spectrum block 140. The reallocation of the mobile phone to channel 1 of the 2.4 GHz spectrum block 140 forces reallocation of the camera, a lower priority activity, to a more noisy channel currently in use for the idle printer. Access point 120 reallocates (see notation 242 of CMAP 220) the camera from "regular" channel 1 of the 2.4 GHz spectrum block 140 to "junk" channel 3 of the 2.4 GHz spectrum block.

Since no other channels 150 are available within the 2.4 GHz spectrum block 140, access point 120 instructs the printer to disconnect for a predetermined period of time and attempt to acquire a channel 150 after the predetermined period of time expires. Access point 120 reallocates (see notation 244 of CMAP 220) the printer from "junk" channel 3 of the 2.4 GHz spectrum block 140 to the "backoff" channel. The Smart TV is already on the best available link and cannot be otherwise reallocated due to its requirements. The reallocation of the mobile phone makes available channel 3 of the 5 GHz spectrum block, which allows reallocation (see notation 248 of CMAP 220) of the speakers from "premium" channel 1 of the 5 GHz spectrum block 140 to "regular" channel 3 of the 5 GHz spectrum block 140. This reallocation allows channel 1 of the 5 GHz spectrum block 140 to be available for 5 GHz devices that require a "premium" Classification.

Upon the introduction of a new smart device (i.e., the 900 MHz only smart light bulb), access point 120 allocates the smart bulb to "regular" channel 3 of the 900 MHz spectrum block 140, which forces reallocation (see notation 246 of CMAP 220) of the lawn sensor from "regular" channel 3 of the 900 MHz spectrum block 140 to a lower quality channel, which is "junk" channel 2 of the 900 MHz spectrum block. This reallocation of the lawn sensor from a "regular" channel to a "junk" channel is acceptable given that only intermittent information is being transmitted from the lawn sensor.

Access point 120 of system 200 includes an interface 250, a memory 260, and a processor 270. Interface 250 of access point 120 represents any suitable computer element that can receive information from network 110, transmit information through network 110, perform suitable processing of the information, communicate to other components (e.g., devices 130 and controller 160) of system 100, or any combination of the preceding. Interface 250 may receive device requirements from devices 130 via network 110, for example, interface 250 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 260 of access point 120 stores, permanently and/or temporarily, received and transmitted information, as well as system software, control software, other software for access point 120, and a variety of other information. Memory 260 may store information for execution by processor 270. Memory 260 includes any one or a combination of volatile or non-volatile local or remote devices suitable for storing information. Memory 260 may include Random Access Memory (RAM), Read-only Memory (ROM), magnetic storage devices, optical storage devices, or any other suitable information storage device or a combination of these devices. Memory 260 may include any suitable information for use in the operation of access point 120. Additionally, memory 260 may be a component external to (or may be partially external to) access point 120. Memory 260 may be located at any location suitable for memory 260 to communicate with access point 120.

Memory 260 may store one or more databases. The one or more databases of memory 260 may store certain types of information for network 110. For example, the one or more databases may store a list of channels 220, channel classifications 230, channel allocations, channel reallocations, and or one or more CMAPs 220. As another example, the one or more databases may store historical information (e.g., last known profiles) to improve the reconnect speed between access point 120 and device 130 upon restart. The databases may be any one or a combination of volatile or non-volatile local or remote devices suitable for storing information. The databases may include RAM, ROM, magnetic storage devices, optical storage devices, or any other suitable information storage device or a combination of these devices.

Processor 270 of access point 120 controls certain operations of access point 120 by processing information received from interface 250 and memory 260 or otherwise accessed by processor 270. Processor 270 communicatively couples to interface 250 and memory 260. Processor 270 may include any hardware and/or software that operates to control and process information. Processor 270 may be a programmable logic device, a microcontroller, microprocessor, any suitable processing device, or any suitable combination of the preceding. Additionally, processor 270 may be a component external to access point 120. Processor 270 may be located in any location suitable for processor 270 to communicate with access point 120.

FIG. 3 shows an example method for channel allocation. Method 300 begins at step 305. At step 310, an access point (e.g., access point 120 of FIG. 1) identifies channels (e.g., channels 150 of FIG. 1) within a spectrum block (e.g., spectrum block 140 of FIG. 1). For example, the access point may identify channel 1, channel 2, and channel 3 of a 2.4 GHz spectrum block, as illustrated in CMAP 220 of FIG. 2.

At step 320, the access point classifies each channel within the spectrum block into a classification (e.g., classifications 230 of FIG. 2). The classifications may include "unusable," "junk," "regular," and "premium" classifications. The access point may classify each of the channels into a classification based on one or more of the following: an effective range of each channel, an estimated capacity due to SNR for each channel, and the requirements of one or more devices utilizing network 110. The access point may classify channel 1 of the 2.4 GHz spectrum block as a "regular" channel. The access point may classify channel 2 of the 2.4 GHz spectrum block, which has an SNR value that is lower than the SNR value of channel 1, as a "premium" channel. The access point may classify channel 3 of the 2.4 GHz spectrum block, which has an SNR value that is higher than the SNR value of channel 1, as a "junk" channel.

At step 330, the access point determines to allocate a first channel to a device (e.g., device 130 of FIG. 1). The access point may determine the channel to allocate based on the requirements of the device (e.g., a minimum/maximum bandwidth requirement, a latency requirement, and/or frequency band capabilities of the device). The device may be a video camera that receives notifications and transmits video in real-time. The access point may determine to allocate channel 3, which is classified as a "junk" channel, to the video camera when the video camera is receiving notifications but not transmitting video. At step 340, the access point allocates channel 3 to the video camera.

At step 350, the access point verifies the requirements of the device (e.g., the required bandwidth of the device). The access point may verify the requirements of the device at regular time intervals. For example, the access point may verify the bandwidth requirements of the device at regular time intervals (e.g., every microsecond) when the device is in use.

At step 360, the access point determines whether the requirements of the device have changed, if the access point determines that the requirements of the device have changed, method 300 may advance from step 360 to step 370, where the access point determines to allocate a second channel to the device. The access point may determine the channel for reallocation based on channel classification. For example, the access point may determine that a video camera that was previously only receiving notifications is now streaming video in real-time, and as a result requires more bandwidth. The access point may reallocate the video camera from "junk" channel 3 of the 2.4 GHz spectrum block to "premium" channel 2 of the 2.4 GHz spectrum block, which has a higher bandwidth. Method 300 advances from step 370 to step 380, where the access point allocates the second channel to the device. Method 300 then advances to step 385, where method 300 ends. If, at step 360, the access point determines that the requirements of the device have not changed, method 300 advances from step 360 to step 385, where method 300 ends.

Modifications, additions, or omissions may be made to method 300 depicted in FIG. 3. Method 300 may include more, fewer, or other steps. For example, method 300 may include verifying, by the access point, the classification of each channel. As another example, method 300 may include determining to allocate a third channel to the device. Steps may be performed in parallel or in any suitable order. While discussed as specific components completing the steps of method 300, any suitable component of system 100 may perform any step of method 300.

FIG. 4 shows an example system 400 for channel allocation among multiple access points of a network. Specifically, FIG. 4 illustrates an exemplary use case for allocating channels from multiple access points to a smart TV when the smart TV begins streaming 8K content. System 400 includes devices 130, controller 160, access point 410, access point 420, and access point 430. The range of each access point 410, 420, and 430 is represented in FIG. 4 as a shaded oval around each access point 410, 420, and 430.

Access point 410 of system 400 allocates channels 150 to devices 130 within its range. Devices 130 within the range of access point 410 include a PC, a mobile phone, wireless speakers, a wireless printer, a webcam, and a smart TV. Multiple channels 150 are required when the smart TV begins streaming 8K content. Access point 410 may not have the required multiple channels 150 available to allocate to the smart TV. For example, the bandwidth requirements of the smart TV and other devices 130 (i.e., the PC, the mobile phone, the wireless speakers, the wireless printer, and the webcam) being serviced by access point 410 may exceed the capacity of the backhaul of access point 410.

Access point 420, which services a camera, a smart light bulb, and a lawn moisture sensor, and access point 430 each have available backhaul that is independent from access point 410. Access point 420 and access point 430 are close enough to the smart TV to provide available channels 150 in the overlapping spectrum. The aggregate bandwidth of channels 150 allocated by access points 410, 420, and 430 is sufficient to meet the requirements of the smart TV. Channels 150 used between access point 420 and the smart TV and channels used between access point 430 and the smart TV are marked in use by access point 410 and avoided to prevent interference between access points 410, 420, and 430. Controller 160 of system 400 distributes the content traffic from network 110 through the backhauls to access points 410, 420, and 430.

FIG. 5 shows an example system 500 for channel allocation of device 130 in motion. Specifically, FIG. 5 illustrates an exemplary use case for allocating channels from multiple access points to device 130 as device 130 moves in and out of the range of each of the multiple access points. System 500 includes device 130, controller 160, access point 510, access point 520, access point 530, access point 540, and chart 550. The range of each access point 510, 520, 530, and 540 is represented in FIG. 5 as a shaded oval around each access point 510, 520, 530, and 540. In this embodiment, device 130 is a mobile device in motion that utilizes at least three channels 150 of bandwidth. Chart 550 represents the number of channels 150 utilized by each access point 510, 520, 530, and 540 as the mobile device moves in and out of the range of each access point 510, 520, 530, and 540. As the mobile device moves in and out of the range of each access point 510, 520, 530, and 540, instead of an abrupt handoff, individual channels 150 between access point 510, 520, 530, and 540 and the mobile device are transitioned between each access point 510, 520, 530, and 540.

The transitioning of channels 150 is coordinated by network controller 160. As illustrated in chart 550, access point 520 allocates three channels 150 to the mobile device while mobile device is within the range of access point 520. As the mobile device transitions into the overlapping range of access points 520 and 510, network controller 160 instructs access point 520 to allocate two channels 150 to the mobile device and instructs access point 510 to allocate one channel 150 to the mobile device. As the mobile device transitions into the outer limits of the range of access point 520 and into the central range of access point 510, network controller 160 instructs access point 520 to allocate one channel 150 to the mobile device and instructs access point 510 to allocate two channels 150 to the mobile device. When the mobile device moves completely out of the range of access point 520 and is only within the range of access point 510, access point 510 allocates all three required channels 150 to the mobile device.

As the mobile device moves into the overlapping range of access points 510, 530, and/or 540, network controller 160 determines the distribution of the at least three required channels 150 between access points 510, 530, and/or 540. Access point 540 is a micro access point with a smaller range than access points 510, 520, and 530. Micro access point 540 may increase the network capacity during the brief window the mobile device is within its range. However, the connection to the macro network is never completely lost. As an example, when the mobile device is within the range of access points 510, 530, and 540, network controller 160 instructs micro access point 540 to allocate two channels to the mobile device and instructs access points 510 and 530 to each allocate one channel to the mobile device to maintain the mobile device's connection to access points 510 and 530.

FIG. 6 shows an example computer system that may be used by the systems and methods described herein. For example, access point 120, devices 130, and/or controller 160 of FIG. 1 may include one or more interface(s) 610, processing circuitry 620, memory(ies) 630, and/or other suitable element(s). Interface 610 (e.g., interface 250 of FIG. 2) receives input, sends output, processes the input and/or output, and/or performs other suitable operation. Interface 610 may comprise hardware and/or software.

Processing circuitry 620 (e.g., processor 270 of FIG. 2) performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 (e.g., memory 260 of FIG. 2) may comprise one or more non-transitory, tangible, computer-readable, and/or computer-executable storage media. Examples of memory 630 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    identifying, by a network access point, a plurality of channels within a spectrum block;
    determining, by the network access point, to allocate at least one channel of the plurality of channels to a device based on requirements of the device;
    allocating, by the network access point, the at least one channel to the device, wherein the at least one channel is exclusively for use between the network access point and the device;
    classifying, by the network access point, each of the plurality of channels into a classification based on one or more of the following:
        a frequency range of each channel;
        an estimated capacity based on a signal-to-noise (SNR) for each channel; and
        device requirements; and
    verifying the classification of each of the plurality of channels at predetermined time intervals;
    wherein determining to allocate the at least one channel of the plurality of channels to the device is further based on the classification of the at least one channel.

2. The method of claim 1, wherein determining, by the network access point, to allocate the at least one channel of the plurality of channels to the device is further based on available backhaul capacity of the at least one channel.

3. The method of claim 1, wherein allocating, by the network access point, the at least one channel to the device comprises aggregating two or more channels of the plurality of channels together and allocating the two or more channels to the device.

4. The method of claim 1, wherein the requirements of the device include one or more of the following:
    a minimum bandwidth requirement;
    a maximum bandwidth requirement;
    a latency requirement; and
    frequency band capabilities.

5. The method of claim 1, wherein the plurality of channels within the spectrum block comprises one of the following:
    at least 400 64 kilohertz (kHz) channels in a 900 Megahertz (MHz) spectrum block;
    at least 1,000 64 kHz channels in a 2.4 Gigahertz (GHz) spectrum block;
    at least 2,000 256 kHz channels in a 5 GHz spectrum block; and
    at least 100,000 10 MHz channels in a 50 GHz spectrum block.

6. The method of claim 1, wherein each channel of the plurality of channels is directional and comprises one of the following:
    send only;
    receive only;
    half-duplex;
    full-duplex; or
    polled.

7. A system comprising one or more processors and a memory storing instructions that, when executed by the one or more processors, cause the one or more processors to perform operations comprising:
    identifying, by a network access point, a plurality of channels within a spectrum block;
    determining, by the network access point, to allocate at least one channel of the plurality of channels to a device based on requirements of the device;
    allocating, by the network access point, the at least one channel to the device, wherein the at least one channel is exclusively for use between the network access point and the device;
    classifying, by the network access point, each of the plurality of channels into a classification based on one or more of the following:
        a frequency range of each channel;
        an estimated capacity based on a signal-to-noise (SNR) for each channel; and
        device requirements; and
    verifying the classification of each of the plurality of channels at predetermined time intervals;
    wherein determining to allocate the at least one channel of the plurality of channels to the device is further based on the classification of the at least one channel.

8. The system of claim 7, wherein determining, by the network access point, to allocate the at least one channel of the plurality of channels to the device is further based on available backhaul capacity of the at least one channel.

9. The system of claim 7, wherein allocating, by the network access point, the at least one channel to the device comprises aggregating two or more channels of the plurality of channels together and allocating the two or more channels to the device.

10. The system of claim 7, wherein the requirements of the device include one or more of the following:
    a minimum bandwidth requirement;
    a maximum bandwidth requirement;
    a latency requirement; and
    frequency band capabilities.

11. The system of claim 7, wherein the plurality of channels within the spectrum block comprises one of the following:
- at least 400 64 kilohertz (kHz) channels in a 900 Megahertz (MHz) spectrum block;
- at least 1,000 64 kHz channels in a 2.4 Gigahertz (GHz) spectrum block;
- at least 2,000 256 kHz channels in a 5 GHz spectrum block; and
- at least 100,000 10 MHz channels in a 50 GHz spectrum block.

12. The system of claim 7, wherein each channel of the plurality of channels is directional and comprises one of the following:
- send only;
- receive only;
- half-duplex;
- full-duplex; or
- polled.

13. One or more non-transitory computer-readable storage media embodying instructions that, when executed by a processor, cause the processor to perform operations comprising:
- identifying, by a network access point, a plurality of channels within a spectrum block;
- determining, by the network access point, to allocate at least one channel of the plurality of channels to a device based on requirements of the device;
- allocating, by the network access point, the at least one channel to the device, wherein the at least one channel is exclusively for use between the network access point and the device;
- classifying, by the network access point, each of the plurality of channels into a classification based on one or more of the following:
  - a frequency range of each channel;
  - an estimated capacity based on a signal-to-noise (SNR) for each channel; and
  - device requirements; and
- verifying the classification of each of the plurality of channels at predetermined time intervals;
- wherein determining to allocate the at least one channel of the plurality of channels to the device is further based on the classification of the at least one channel.

14. The one or more non-transitory computer-readable storage media of claim 13, wherein determining, by the network access point, to allocate the at least one channel of the plurality of channels to the device is further based on available backhaul capacity of the at least one channel.

15. The one or more non-transitory computer-readable storage media of claim 13, wherein allocating, by the network access point, the at least one channel to the device comprises aggregating two or more channels of the plurality of channels together and allocating the two or more channels to the device.

16. The one or more non-transitory computer-readable storage media of claim 13, wherein the requirements of the device include one or more of the following:
- a minimum bandwidth requirement;
- a maximum bandwidth requirement;
- a latency requirement; and
- frequency band capabilities.

17. The one or more non-transitory computer-readable storage media of claim 13, wherein the plurality of channels within the spectrum block comprises one of the following:
- at least 400 64 kilohertz (kHz) channels in a 900 Megahertz (MHz) spectrum block;
- at least 1,000 64 kHz channels in a 2.4 Gigahertz (GHz) spectrum block;
- at least 2,000 256 kHz channels in a 5 GHz spectrum block; and
- at least 100,000 10 MHz channels in a 50 GHz spectrum block.

* * * * *